United States Patent
Whipple et al.

(10) Patent No.: US 10,125,898 B2
(45) Date of Patent: Nov. 13, 2018

(54) CABLE SUSPENSION ASSEMBLY

(71) Applicant: Thomas & Betts International LLC, Wilmington, DE (US)

(72) Inventors: Charles E. Whipple, Collierville, TN (US); Mark R. Drane, Germantown, TN (US); Andrew Cole, Memphis, TN (US); Joey Magno, Cordova, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 10 days.

(21) Appl. No.: 15/612,184

(22) Filed: Jun. 2, 2017

(65) Prior Publication Data

US 2017/0335995 A1    Nov. 23, 2017

Related U.S. Application Data

(63) Continuation of application No. 12/888,493, filed on Sep. 23, 2010, now Pat. No. 9,671,046.

(60) Provisional application No. 61/247,192, filed on Sep. 30, 2009.

(51) Int. Cl.
*F16L 3/233* (2006.01)
*F16L 3/24* (2006.01)
*H02G 3/30* (2006.01)

(52) U.S. Cl.
CPC ............. *F16L 3/233* (2013.01); *F16L 3/24* (2013.01); *H02G 3/30* (2013.01); *H05K 999/99* (2013.01); *Y10T 29/49817* (2015.01); *Y10T 29/49826* (2015.01)

(58) Field of Classification Search
CPC .... F16L 3/233; F16L 3/24; H02G 3/30; Y10T 29/49817; Y10T 29/49826
USPC ............ 248/58, 65, 49, 60, 74.3, 74.2, 74.4
See application file for complete search history.

(56) References Cited

U.S. PATENT DOCUMENTS

| | | | | |
|---|---|---|---|---|
| 2,466,247 A | * | 4/1949 | Land ......................... | F16L 3/14 248/62 |
| 2,671,625 A | * | 3/1954 | Buckley ..................... | F16L 3/11 248/58 |
| 3,051,424 A | * | 8/1962 | Duhamel ................... | F16L 3/11 248/62 |
| 3,323,766 A | * | 6/1967 | Schauster ................. | F16L 3/11 248/62 |
| 3,721,412 A | | 3/1973 | Kindorf | |
| 5,110,074 A | * | 5/1992 | Deguchi ................... | F16B 2/06 248/340 |

(Continued)

FOREIGN PATENT DOCUMENTS

GB    2241040 A    8/1991

*Primary Examiner* — Muhammad Ijaz
(74) *Attorney, Agent, or Firm* — Taft Stettinius & Hollister LLP

(57) ABSTRACT

A cable hanger is disclosed. The cable hanger may include a first latch configured to suspend the cable hanger from a strut and a second latch configured to suspend the cable hanger from the strut. The cable hanger may also include a cable saddle to hold one or more cables. When the cable hanger is suspended by the first latch and not the second latch, a gap may be formed between the cable saddle and the strut such that the cable saddle is configured to receive the one or more cables through the gap. When the cable hanger is suspended by the second latch, the gap may be closed between the cable saddle and the strut to secure the one or more cables.

17 Claims, 23 Drawing Sheets

(56) References Cited

U.S. PATENT DOCUMENTS

| | | | | |
|---|---|---|---|---|
| 5,472,159 A * | 12/1995 | Kuffel | ............... | F16L 3/00 |
| | | | | 24/458 |
| 5,927,041 A * | 7/1999 | Sedlmeier | ............... | E04B 9/064 |
| | | | | 248/49 |
| 6,257,530 B1 * | 7/2001 | Tsai | ............... | F16L 3/127 |
| | | | | 248/73 |
| 6,959,898 B1 * | 11/2005 | Laughlin | ............... | F16L 3/26 |
| | | | | 248/58 |
| 7,090,174 B2 * | 8/2006 | Korczak | ............... | F16B 21/075 |
| | | | | 248/58 |
| 7,661,634 B2 * | 2/2010 | Thompson | ............... | B65D 63/1072 |
| | | | | 24/274 R |
| 8,020,811 B2 * | 9/2011 | Nelson | ............... | F16L 3/2235 |
| | | | | 174/68.1 |
| 2006/0008338 A1 * | 1/2006 | Oh | ............... | F16B 7/187 |
| | | | | 411/87 |
| 2006/0177246 A1 | 8/2006 | Kawada et al. | | |
| 2006/0178246 A1 * | 8/2006 | Tjerrild | ............... | F16L 3/133 |
| | | | | 482/24 |
| 2007/0120036 A1 * | 5/2007 | Olle | ............... | F16L 3/24 |
| | | | | 248/615 |

\* cited by examiner

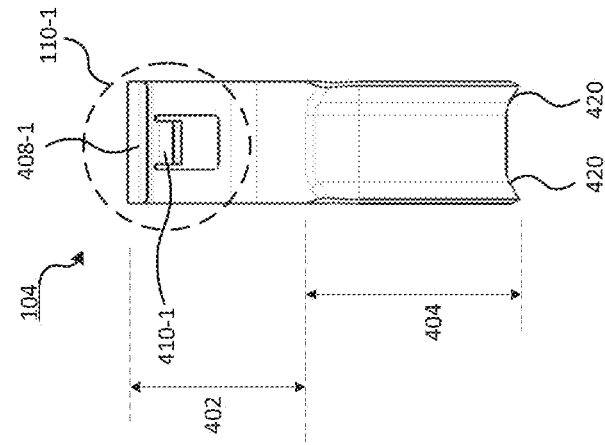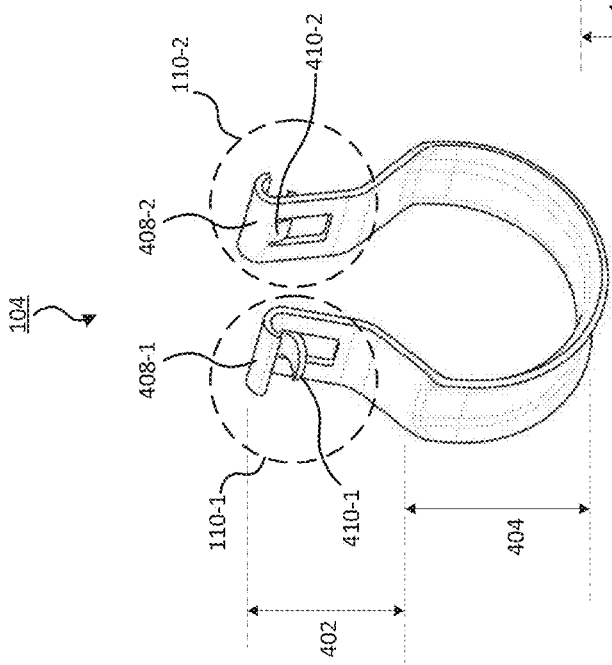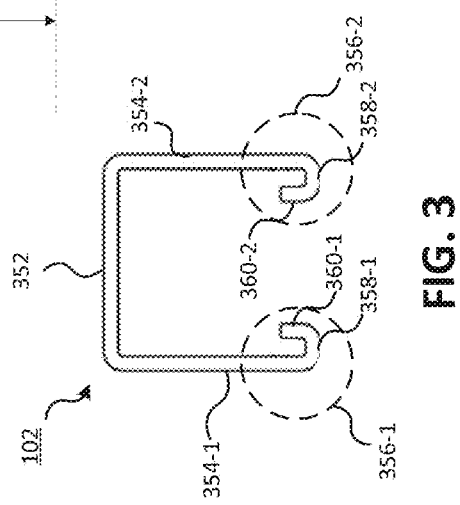

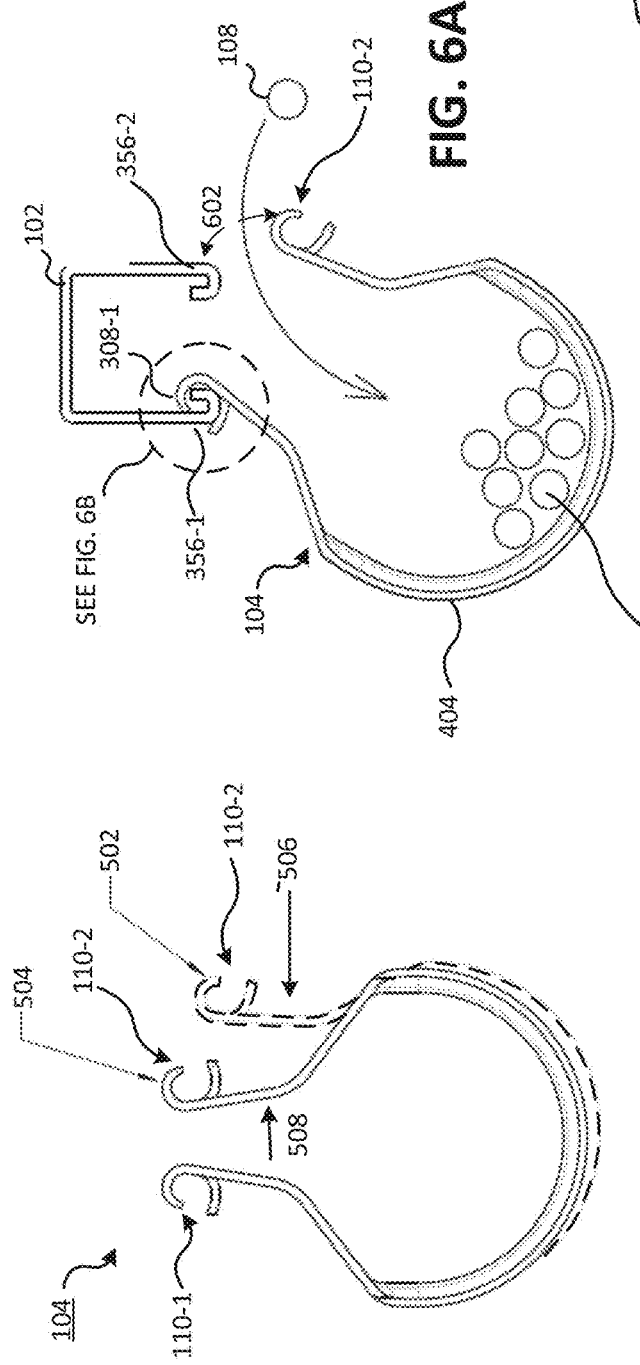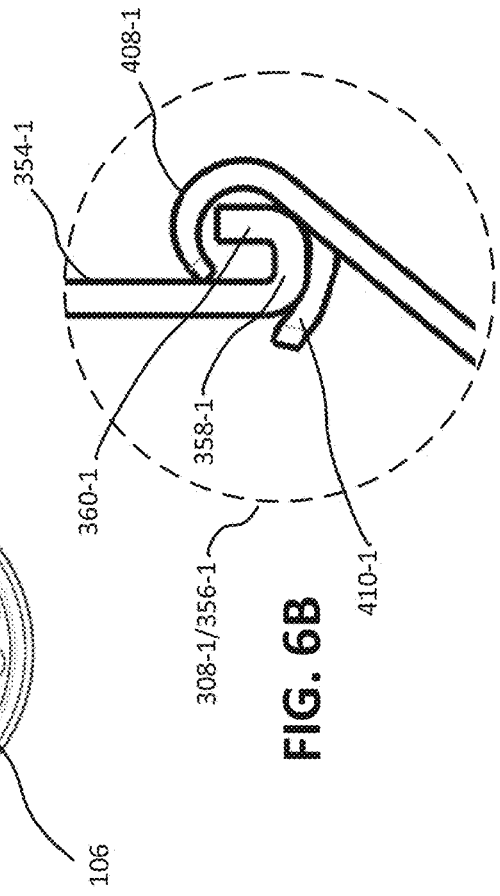

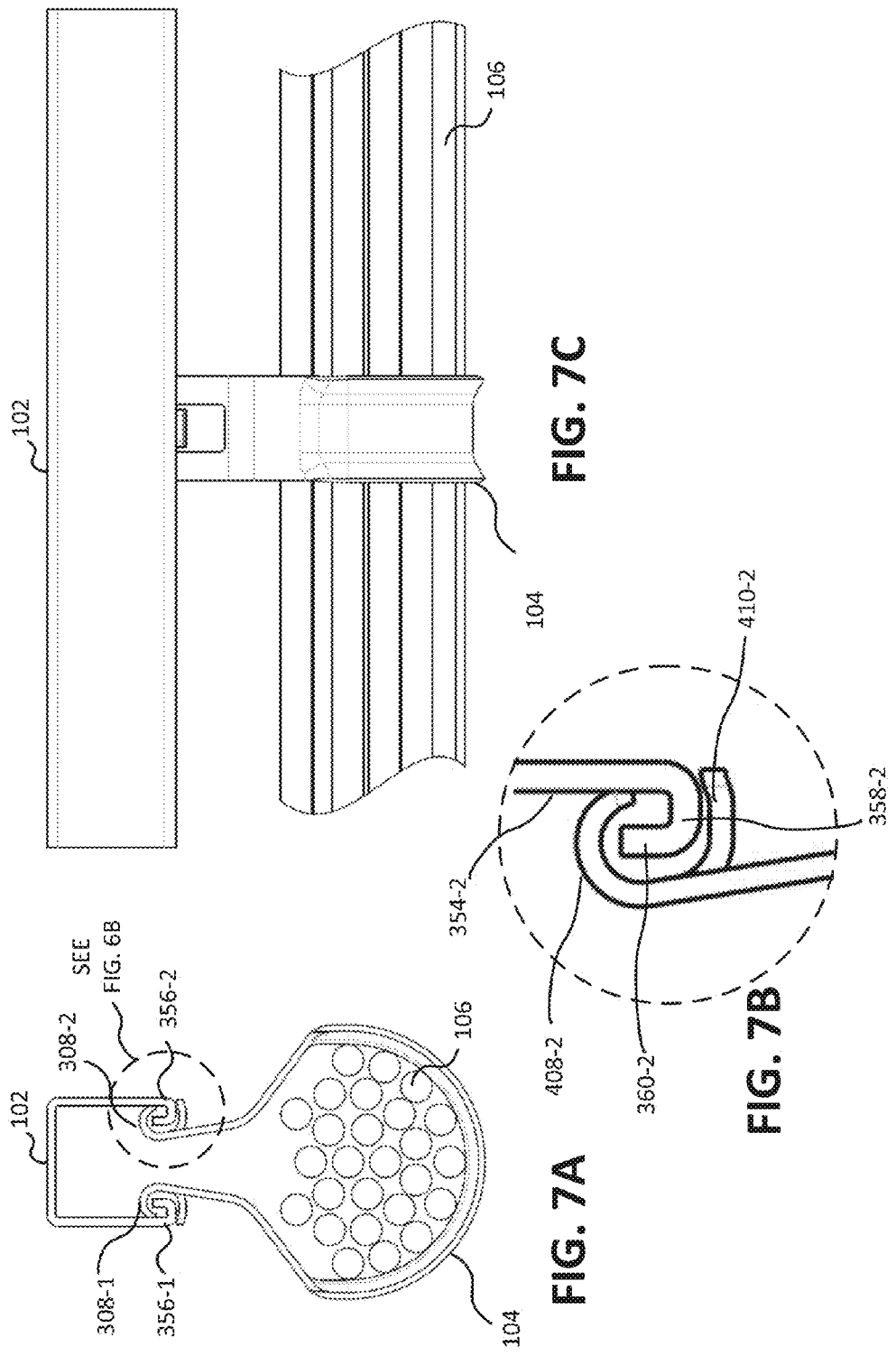

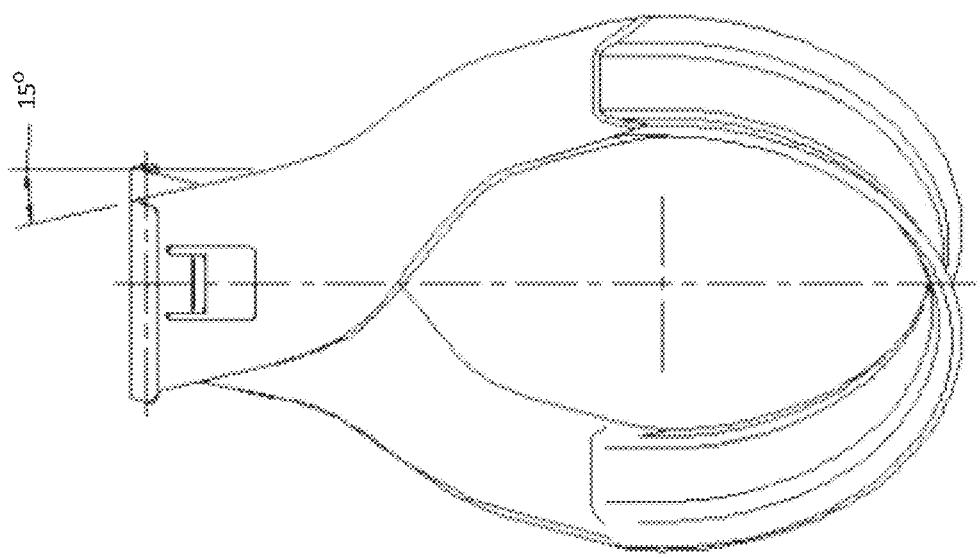

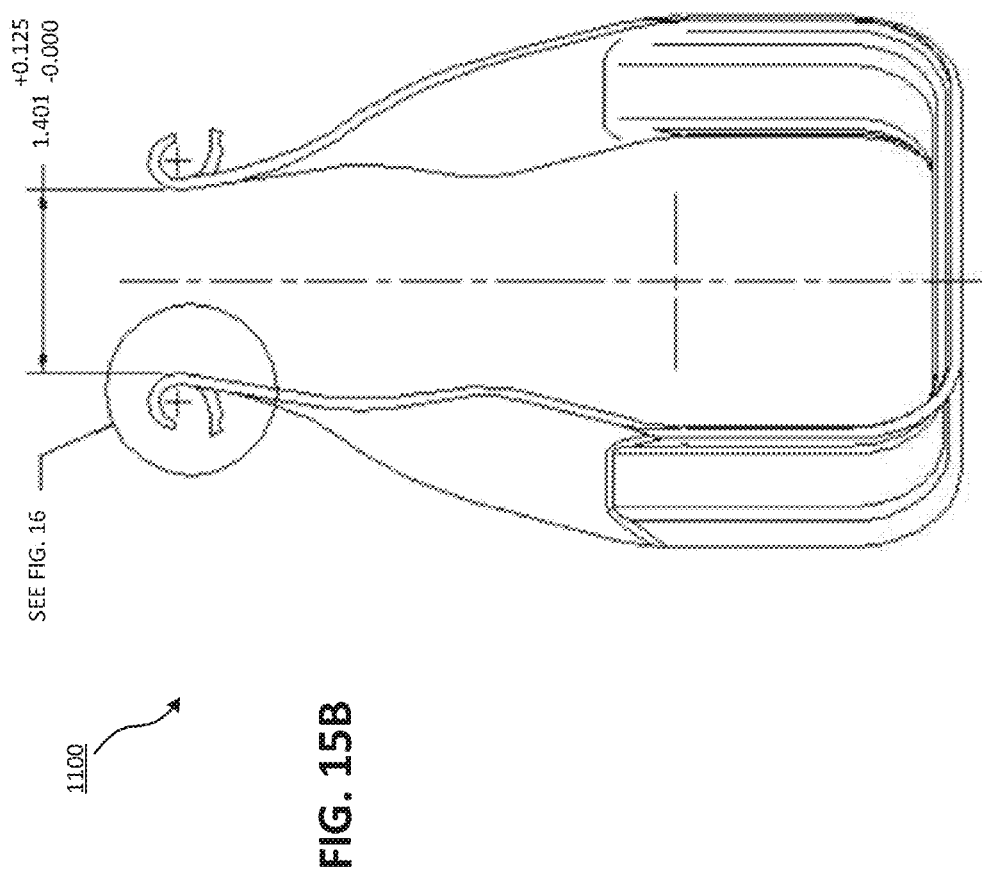

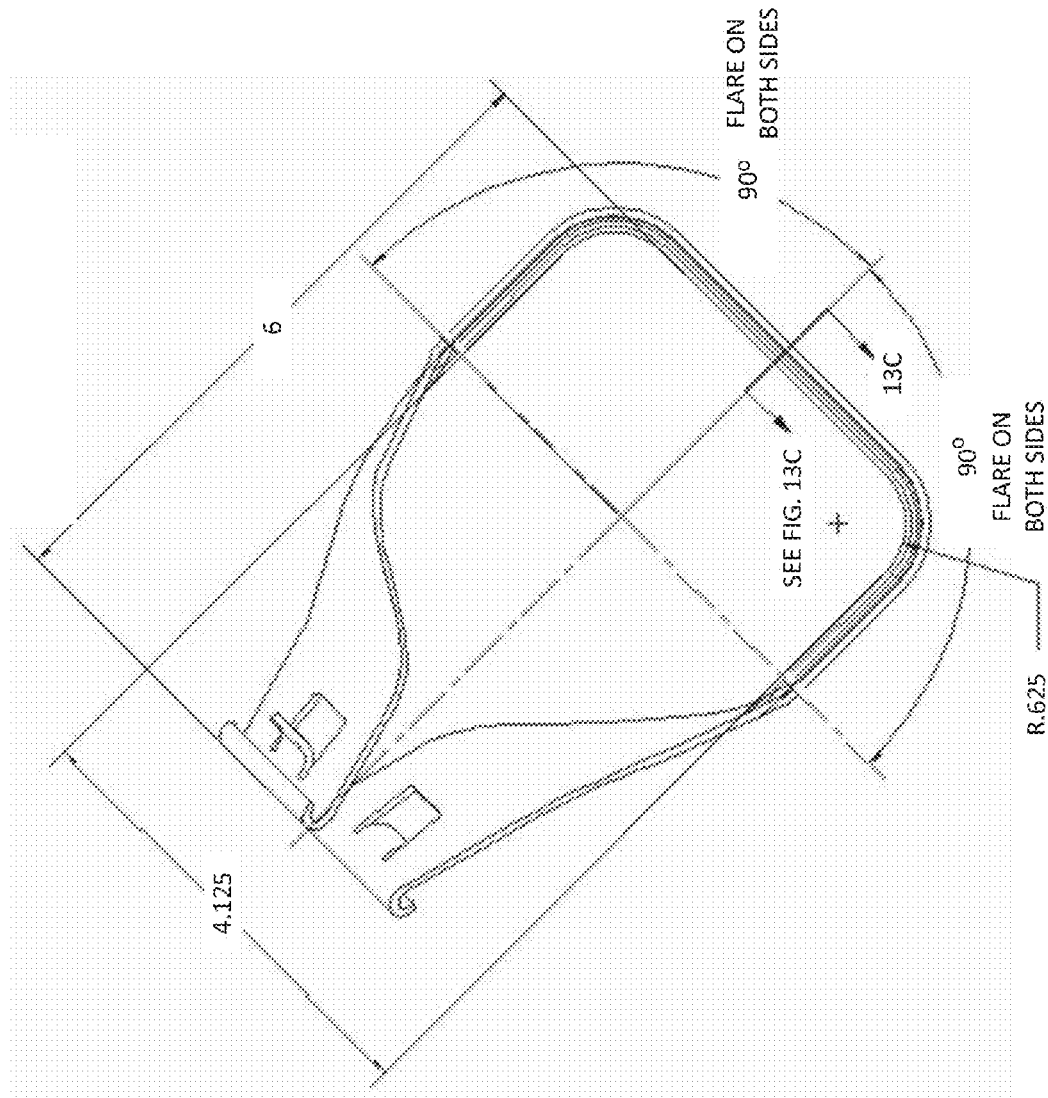

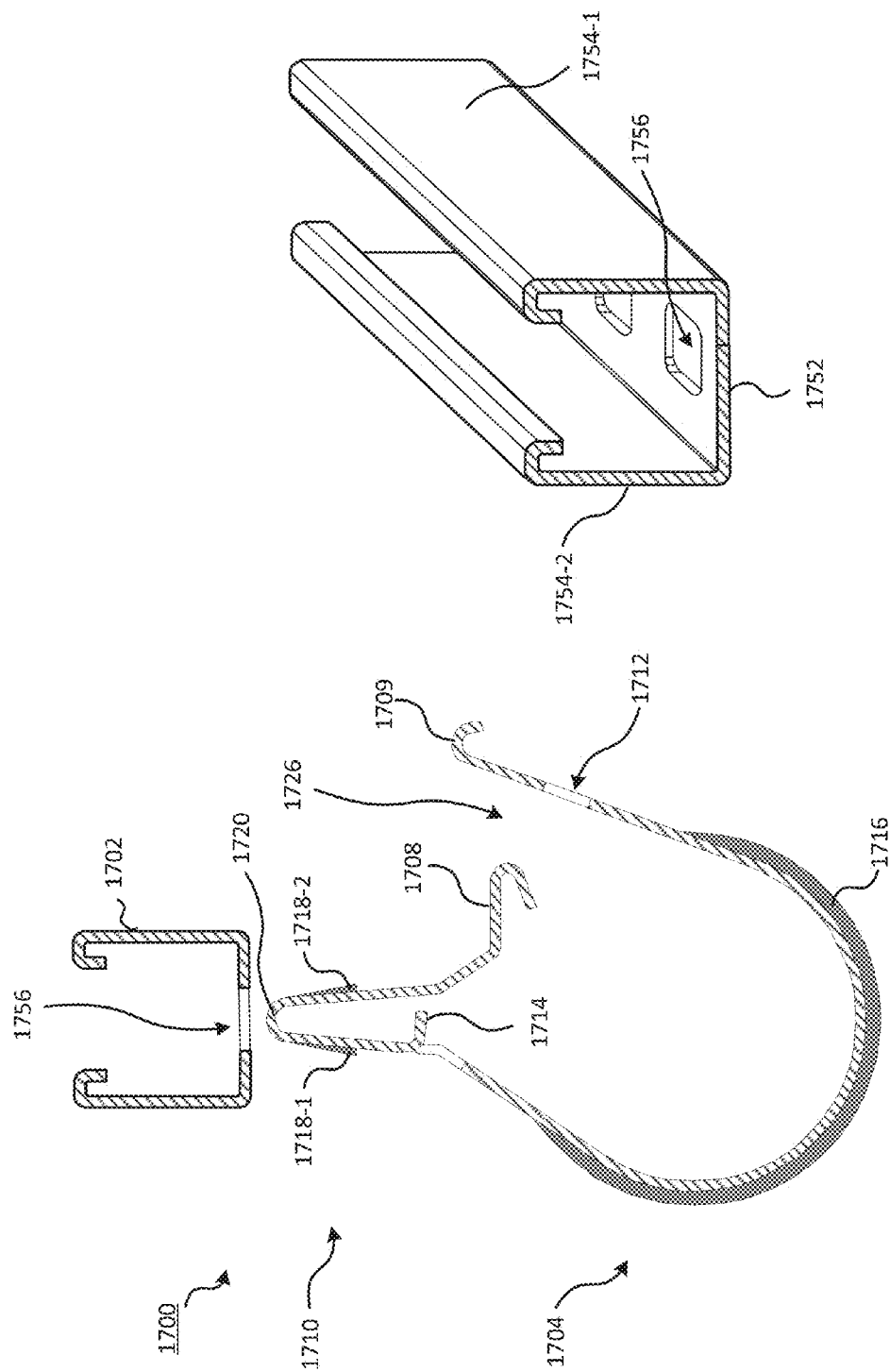

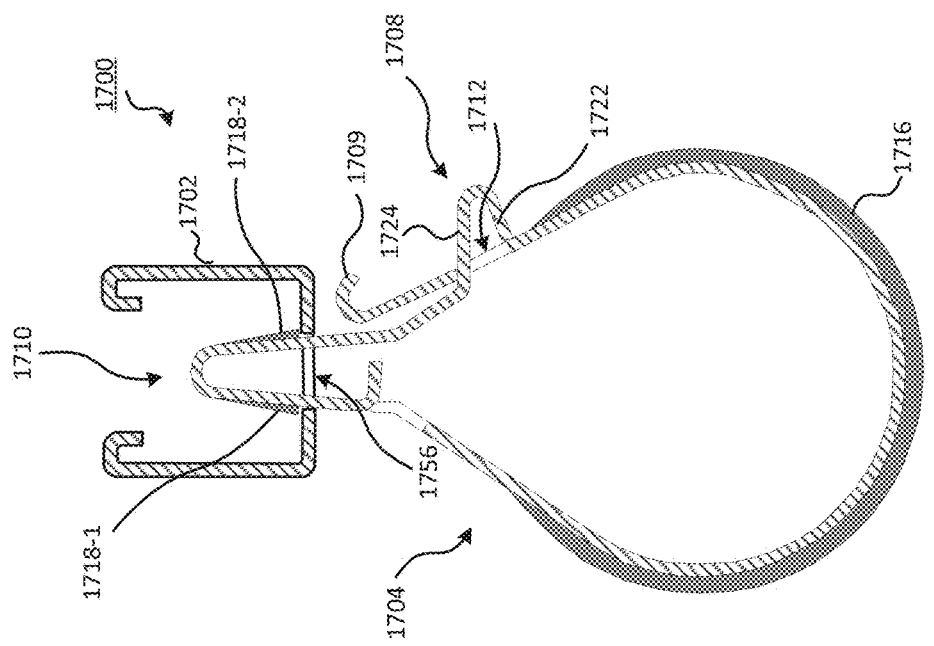
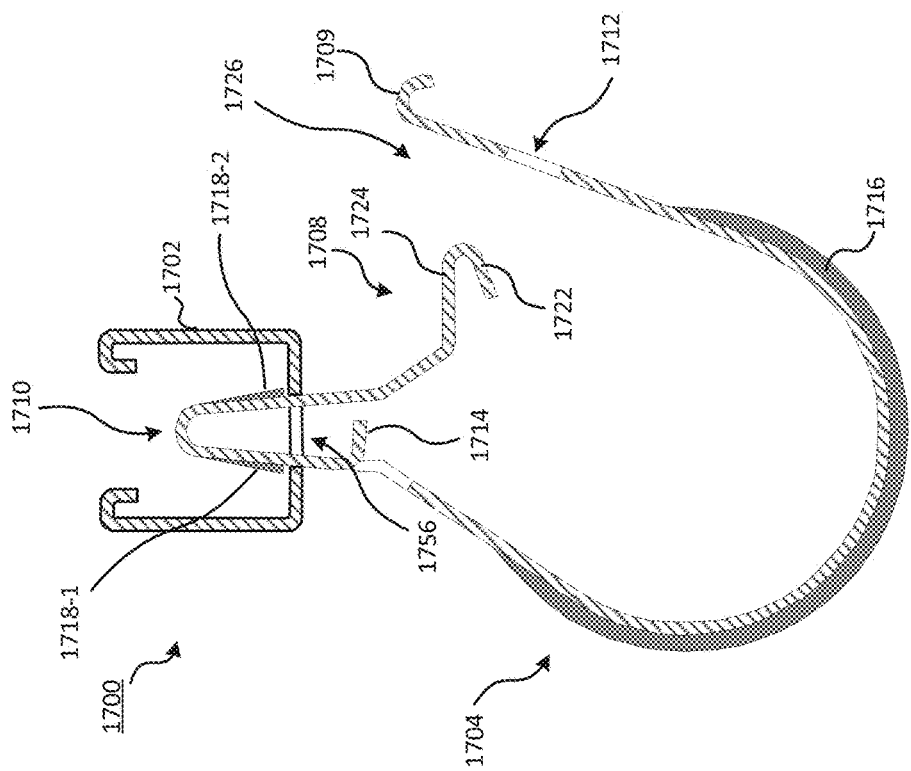
FIG. 19B
FIG. 19A

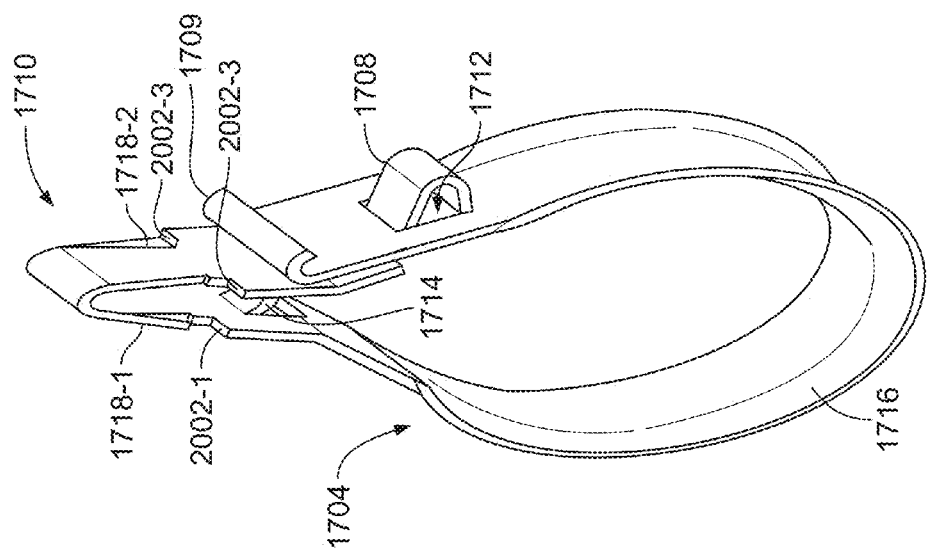
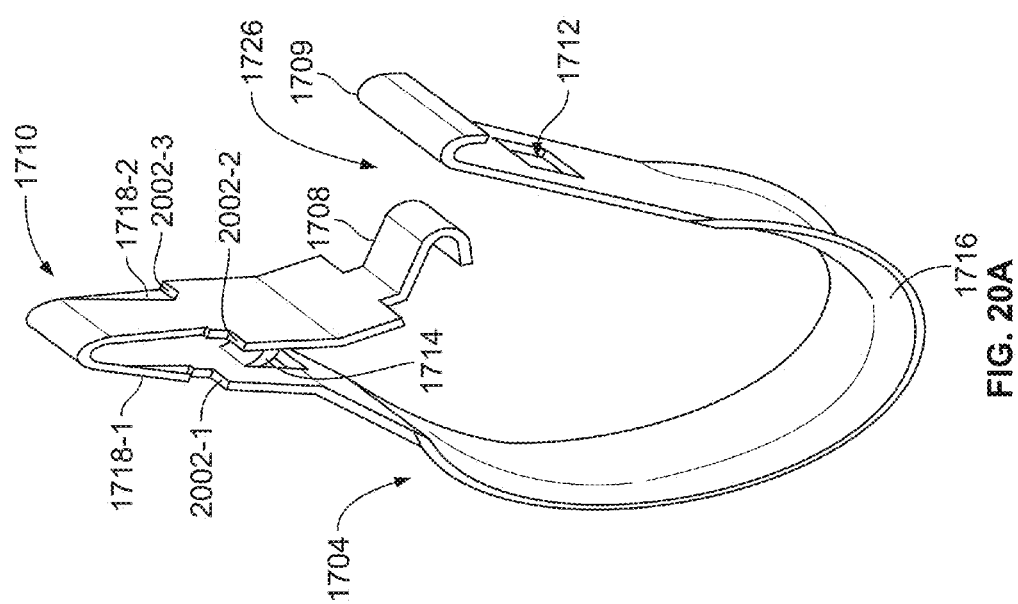

CABLE SUSPENSION ASSEMBLY

RELATED APPLICATIONS

This application claims the benefit of U.S. Provisional Patent Application No. 61/247,192, filed Sep. 30, 2009, titled "Cable Suspension Assembly," and is a continuation of U.S. patent application Ser. No. 12/888,493, filed on Sep. 23, 2010, now U.S. Pat. No. 9,671,046, each of which is incorporated herein.

BACKGROUND OF THE INVENTION

The present invention relates generally to a support for cables. As the computer, communications, and energy industries have grown, the organization and management of the associated cabling has become increasingly important. Such cables may carry data through a network, data between a computer and its peripherals, or power from a power plant to a power converter or storage unit, for example.

BRIEF DESCRIPTION OF THE DRAWINGS

FIG. 3 is a cross-sectional drawing of the exemplary strut of FIG. 1;

FIG. 4A is a projection drawing of the exemplary cable hanger of FIG. 1;

FIG. 4B is a drawing of the cable hanger of FIG. 1 viewed from the side;

FIG. 5 is a drawing of the cable hanger of FIG. 1 in a rest state or open position and in a compressed state or closed position;

FIGS. 6A and 6B are cross-sectional drawings of the cable hanger of FIG. 1 partially latched onto a strut;

FIGS. 7A and 7B are cross-sectional drawings of the cable hanger of FIG. 1 fully latched onto a strut;

FIG. 7C is a diagram of the cable hanger of FIG. 1, viewed from the side, fully latched onto a strut;

FIGS. 14A, 14B, and 14C are diagrams of the exemplary cable hanger of FIG. 10 including exemplary dimensions;

FIGS. 15A, 15B, and 15C are diagrams of the exemplary cable hanger of FIG. 11 including exemplary dimensions;

FIG. 17 is a drawing of an exemplary cable suspension assembly in an unassembled configuration;

FIG. 18 is an isometric drawing of an exemplary strut;

FIG. 19A is a drawing of a side view of the exemplary cable suspension assembly of FIG. 17 in an assembled, but unlatched configuration;

FIG. 19B is a drawing of the side view of the exemplary cable suspension assembly of FIG. 17 in an assembled and latched configuration;

FIGS. 20A and 20B are drawings of the exemplary cable hanger of FIG. 17 in an unlatched and latched configuration;

DETAILED DESCRIPTION OF THE PREFERRED EMBODIMENTS

Alternative energy sources, such as solar photovoltaic panels, may be supported by a metal frame comprising struts. Cables carrying the electrical energy (e.g., low-voltage current) away from the solar panels may pass under and around the metal frame. In exemplary embodiments described below, cable hangers may latch or hang onto the struts (or be suspended from the struts) such that the cables may be supported by the cable hangers. In one embodiment, an operator may add cables to a cable hanger when the cable hanger is suspended from a strut in a partially-latched position. In this embodiment, the operator may then secure the cables by fully latching the cable hanger to the strut.

Figure 1:
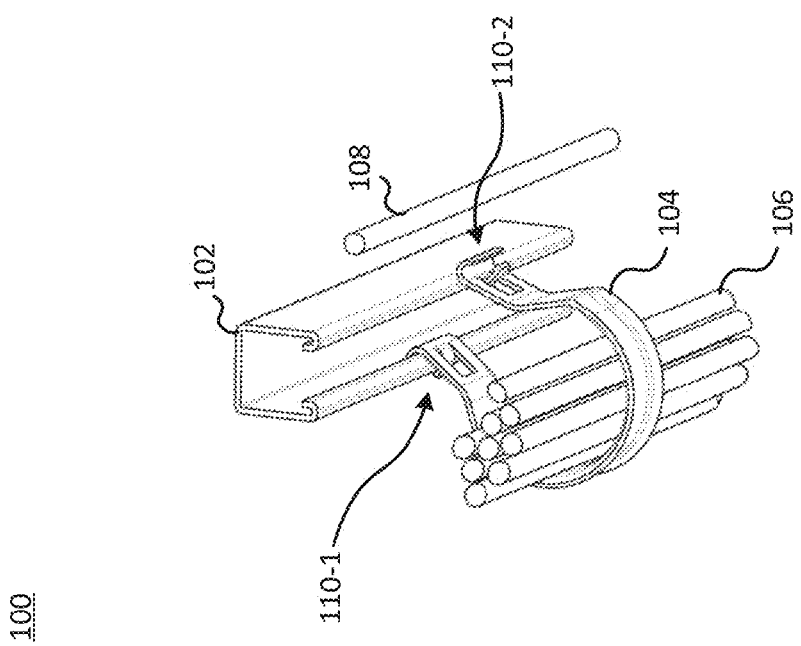
FIG. 1 is a projection drawing of an exemplary cable suspension assembly in a partially latched configuration.

FIG. 1 is a projection drawing of an exemplary cable suspension assembly 100 in a partially latched configuration. Assembly 100 includes a strut 102, a cable hanger 104, bundled cables 106, and a loose cable 108. Hanger 104 includes a first latch 110-1 and a second latch 110-2 (collectively, latches 110). In the configuration of FIG. 1, first latch 110-1 is hooked onto strut 102, while second latch 110-2 is not. Rather, in this configuration, a gap between strut 102 and second latch 110-2 allows for loose cable 108 to be placed inside hanger 104 with the other bundled cables 106.

Figure 2:
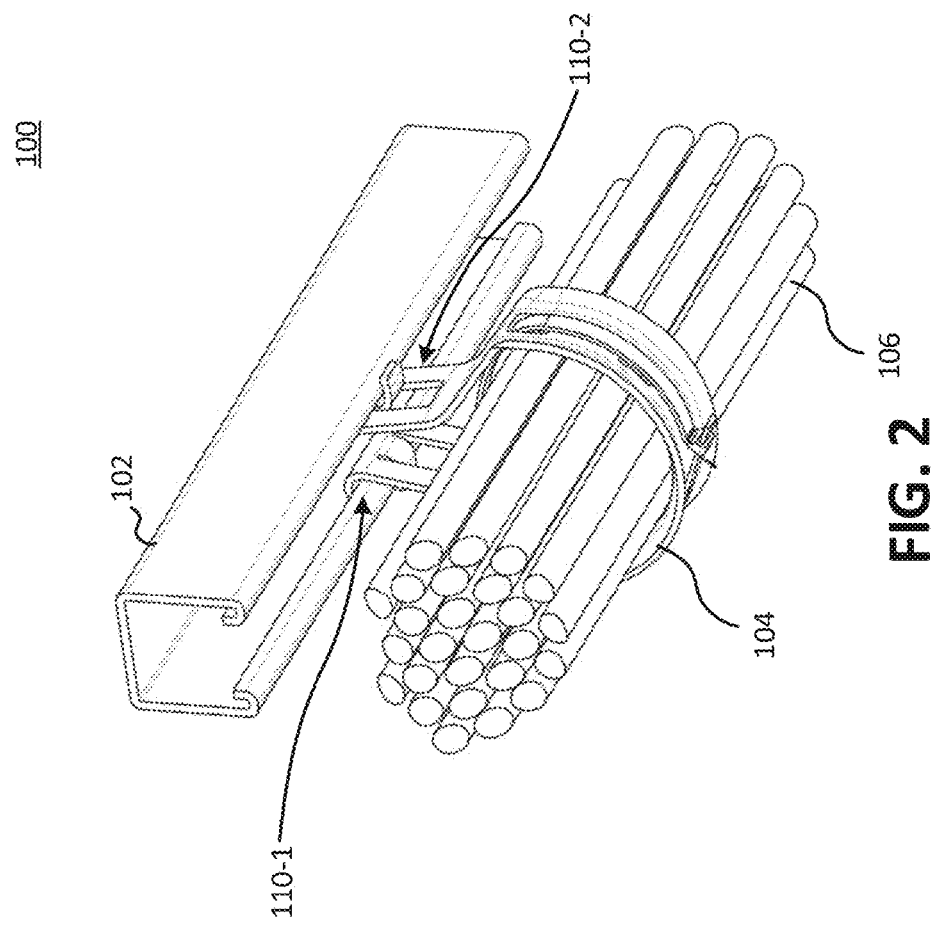
FIG. 2 is a projection drawing of the exemplary cable suspension assembly of FIG. 1 in a fully latched configuration.

FIG. 2 is a projection drawing of exemplary cable suspension assembly 100 in a fully latched configuration. Like FIG. 1, assembly 100 includes strut 102 and hanger 104 having first latch 110-1 and second latch 110-2. Unlike the configuration of FIG. 1, however, both first latch 110-1 and second latch 110-2 are hooked onto strut 102. In this configuration, bundled cables 106 may be securely suspended from hanger 104.

As discussed above, hanger 104 is suspended from strut 102. FIG. 3 is a cross-sectional drawing of strut 102. Strut 102 may include a top portion 352, a first leg 354-1 and a second leg 354-2 (collectively, legs 354), and a first flange 356-1 and a second flange 356-2 (collectively, flanges 356). First flange 356-1 may include a first inwardly projecting portion 358-1 and a first upwardly projecting portion 360-1. Likewise second flange 356-2 may include a second inwardly projecting portion 358-2 and a second upwardly projecting portion 360-2.

FIG. 4A is a projection drawing of hanger 104 and FIG. 4B is a side view hanger 104. Hanger 104 may include a latch portion 402 and a support portion 404. Latch portion 402 may fully or partially latch onto strut 102. In the embodiment of FIG. 3, latch portion 402 includes first latch 110-1 and second latch 110-2. First latch 110-1 may include a hook 408-1 and a tab 410-1. In one embodiment, second latch 110-2 may be similarly configured, e.g., second latch 110-2 may include a hook 408-2 and a tab 410-2. In one embodiment, first latch 110-1 may hook onto first flange 356-1 of strut 102 and second latch 110-2 may hook onto second flange 356-2 of strut 102, thus latching hanger 104 onto strut 102.

In one embodiment, support portion 404 may hold one or more cables (e.g., cable bundle 106) when one or both latches 110 are hooked onto strut 102. Support portion 404 may also be referred to as "a cable saddle 404." A "cable saddle" as the term is used herein means a structure with one or more sides or a base that can support a cable without the cable falling. For example, a cable saddle can hold a cable such that it would first require an operator to lift the cable before the cable would fall downward away from the cable saddle.

As shown in FIG. 4B, support portion 404 may, in one embodiment, include downwardly formed portions 420 on both sides of hanger 104. Downwardly formed portions 420 may allow the bundle of cables 106 to rest on support portion 404 while avoiding contact between the edges of hanger 104 with cables 106. This embodiment may help prevent the outer insulation of cables 106 from being worn by the edges of support portion 404.

Hanger 104 may include or have the qualities of a spring, e.g., hanger 104 may have a rest state and a compressed state. FIG. 5 is a drawing of hanger 104 in a rest state 502 (or open position 502) and in a compressed state 504 (closed position 504). Rest state 502 may include a greater distance between first latch 110-1 and second latch 110-2 than in compressed state 504. A force (e.g., an operator force 506 greater than a tension force 508) may be applied to first latch 110-1 and/or second latch 110-2 to move hanger 104 from rest state 502 into compressed state 504. That is, operator force 506 may move second latch 110-2 closer to first latch 110-1. In this case, first latch 110-1 may be fixed if, for example, it is hooked onto strut 102. In compressed state 504, tension force 508 may operate to move first latch 110-1 away from second latch 110-2 until hanger 104 returns to rest state 502. Tension force 508 may be provided for by the resilience of hanger 104, including the resilience of support portion 404. In the fully latched position of hanger 104 onto strut 102, tension force 508 may help prevent hanger 104 from disengaging from strut 102. Although the spring in hanger 104 is provided for by the shape and materials of hanger 104 itself, in one embodiment, hanger 104 may include a separate spring (not shown). For example, hanger 104 may include a coil spring that provides tension force 508 when compressed.

FIGS. 6A and 6B are cross-sectional drawings of hanger 104 partially latched onto strut 102. In the position shown in FIG. 6A, hanger 104 is in open position 502. As shown in more detail in FIG. 6B, hanger 104 is suspended by hook 308-1 onto flange 356-1. In this embodiment, hook 308-1 may contact upwardly projecting portion 360-1 and may reside in a portion of the space formed between first leg 354-1, inwardly projecting portion 358-1, and upwardly projecting portion 360-1. Hanger 104 may be able to move relative to flange 356-1. In other words, upwardly projecting portion 360-1 may come into contact with different portions of hook 308-1 such that hanger 104 is suspended from a different portion of hook 308-1. In effect, hanger 104 may rotate about upwardly projecting portion 358-1.

In relaxed state 502 shown in FIG. 6A, the increased space between first latch 110-1 an second latch 110-2 may allow for a gap 602 such that loose cable 108 to be placed within cable saddle 404 of hanger 104 (shown with arrow 502). Once inside cable saddle 404, loose cable 108 may join the bundle of cables 106. In the embodiment of FIG. 6A, gap 602 lies between first flange 356-2 and second latch 110-2. Gap 602 may also be considered as being between saddle 104 and strut 102, or between second hook 408-2 and strut 102, for example.

FIGS. 7A and 7B are cross-sectional drawings of hanger 104 fully latched onto strut 102 with the bundle of cables 106. FIG. 7C is a side view of hanger 104 fully latched onto strut 102 with the bundle of cables 106. In the position shown in FIGS. 7A through 7C, hanger 104 is in compressed state or closed position 502 (shown in FIG. 5). As shown, hanger 104 is suspended by first hook 308-1 onto first flange 356-1 and by second hook 308-2 onto second flange 356-2. In this embodiment, as with the partially latched configuration of FIGS. 6A and 6B, first hook 308-1 may contact upwardly projecting portion 360-1 and may reside in portion of the space formed between first leg 354-1, inwardly projecting portion 358-1, and upwardly projecting portion 360-1. Likewise, as with first hook 308-1, second hook 308-2 may contact upwardly projecting portion 360-2 and may reside in portion of the space formed between second leg 354-2, inwardly projecting portion 358-2, and upwardly projecting portion 360-2.

From uncompressed state (or open position) 502 shown in FIG. 6A, gap 602 between first latch 110-1 and strut 102 may be reduced by, for example, applying operator force 506 greater than tension force 508. Second latch 110-2 may be raised (relative to its position in FIG. 6A) and placed inside strut 102 such that both latches 110 engage strut 102. First tab 310-1 may prevent first latch 110-1 from being pushed upward into strut 102 while lifting second latch 110-2 into the position shown in FIG. 7A. In this embodiment, second latch 110-2 may "snap" into place as shown in FIG. 7A. Once fully latched, in one embodiment, tabs 310 may prevent hanger 104 from being pushed upward into strut 102.

In the position shown in FIGS. 7A through 7C, the bundle of cables 106 may be secure. That is, gap 602 has been reduced such that none of the cables in bundle 106 may pass between hanger 104 and strut 102 (e.g., in a direction transverse to the length of the cable). In other words, the cables in bundle 106 are fully surrounded by some type of structure, such as hanger 104 or strut 102. In this fully-latched position, an additional cable cannot be added to bundle 106 from outside the area defined by hanger 104 and strut 102 without first unlatching hanger 104 (except by threading such a cable through the area). Further, in this fully-latched position, none of the cables in bundle 106 may be removed from the area defined by hanger 104 and strut 102 without first unlatching hanger 104 (except by unthreading such a cable through the area). In other words, in the fully-latched position, a cable cannot be added to hanger 104 by placing the cable into hanger 104 in a direction transverse to the length of the cable. Likewise, in the fully-latched position, a cable cannot be removed from hanger 105 by removing the cable from hanger 104 in a direction transverse to the length of the cable.

Hanger 104 may be formed from a single piece of metal. In this embodiment, the single piece of metal may provide the resilience to generate tension force 508. Also, in this embodiment, one-piece construction may reduce the cost of manufacture as compared to a cable hanger that is formed from multiple pieces. In addition, in one embodiment, hanger 104 may be latched onto strut 102 without bolts, nuts, or threaded rods. In another embodiment, however, bolts, nuts, or threaded rods may be used to provide additional support and/or strength.

In another embodiment, latches 110 may include hooks 408 but no tab 410. In this embodiment, latches 110 may "latch" onto strut 102 by being suspended from strut 102 by hooks 408.

Figure 9:
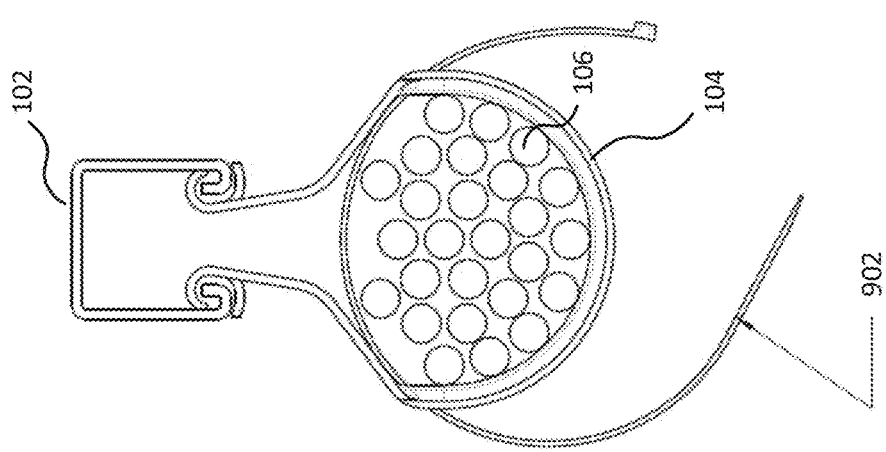
FIG. 9 is a cross-sectional drawing of the exemplary cable hanger of FIG. 8 fully latched to a strut.
Figure 8:
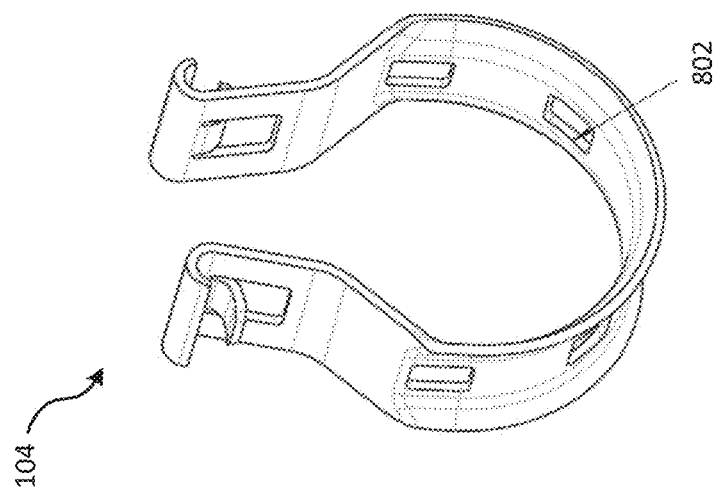
FIG. 8 is a projection drawing of an exemplary cable hanger in one embodiment.

FIG. 8 is a projection drawing of cable hanger 402 in another embodiment. In this embodiment, hanger 104 includes holes 802 to allow tying of the bundle of cables 106. FIG. 9 is a cross-sectional view of hanger 104 fully latched to strut 102. As shown, a cable tie 902 may be threaded through holes 802 so as to cover the bundle of cables 106. The loose ends of cable tie 902 may be fastened and tightened, as shown in FIG. 2. Cable tie 902 may further secure the bundle of cables 106.

Figure 10A:
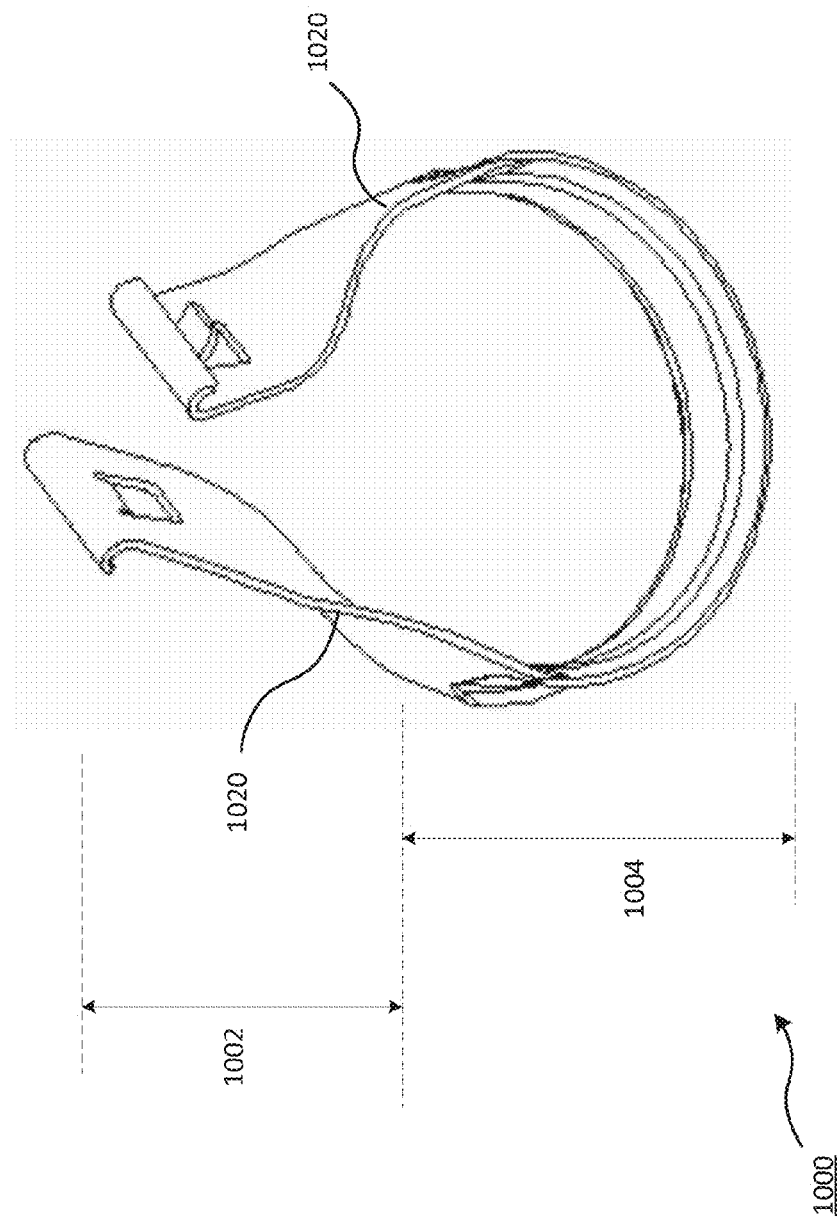
FIGS. 10A and 10B are drawings of an exemplary cable hanger in one embodiment.

In the embodiment discussed above (e.g., FIGS. 7A through 7C), the bundle of cables 106 run parallel to strut 102. In other embodiments, the bundle of cables 106 may run at an angle to strut 102. For example, FIG. 10A is a projection drawing of a cable hanger 1000 in such an embodiment. Hanger 1000 may include a latch portion 1002 and a cable saddle 1004 (or support portion 1004), similar to latch portion 402 and cable saddle 404 of FIG. 4. Latch portion 1002 may fully or partially latch onto a strut, such as strut 102.

Figure 10B:
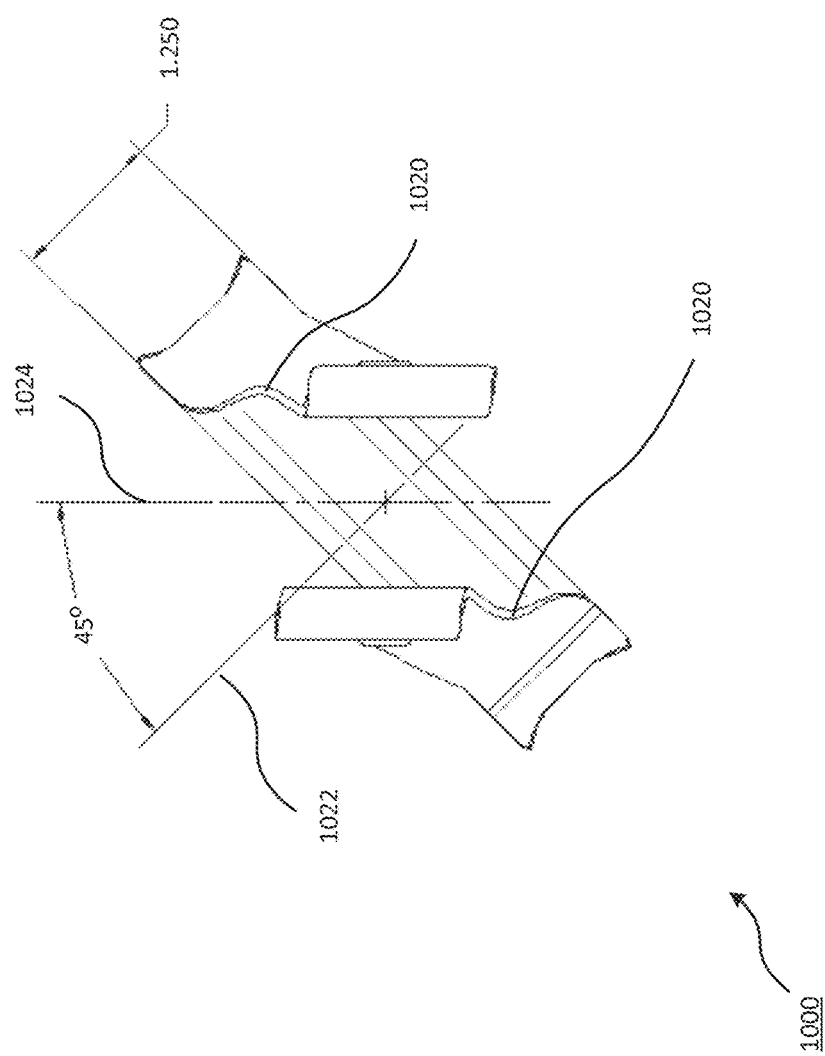

Hanger 1000 may include a transition portion 1020 between latch portion 1002 and cable saddle 1004. Transition portion 1020 may align the latch portion 1002 such that latch portion 1002 may latch to a strut such that a cable bundle may pass through cable saddle 1004 at an angle other than parallel to the strut. For example, FIG. 10B is a diagram of hanger 1000 viewed from above. An axis 1024 may run parallel to a strut, such as strut 102, to which hanger 1000 attaches. An axis 1022 may run parallel to a bundle of cables that may pass through cable saddle 1004. In the embodiment shown in FIG. 10B, axis 1022 and axis 1024 are 45 degrees apart. In this embodiment, cables may run past a strut at a 45 degree angle, for example. Any other angle is possible, such as any angle between zero and 90 degrees.

Figure 11A:
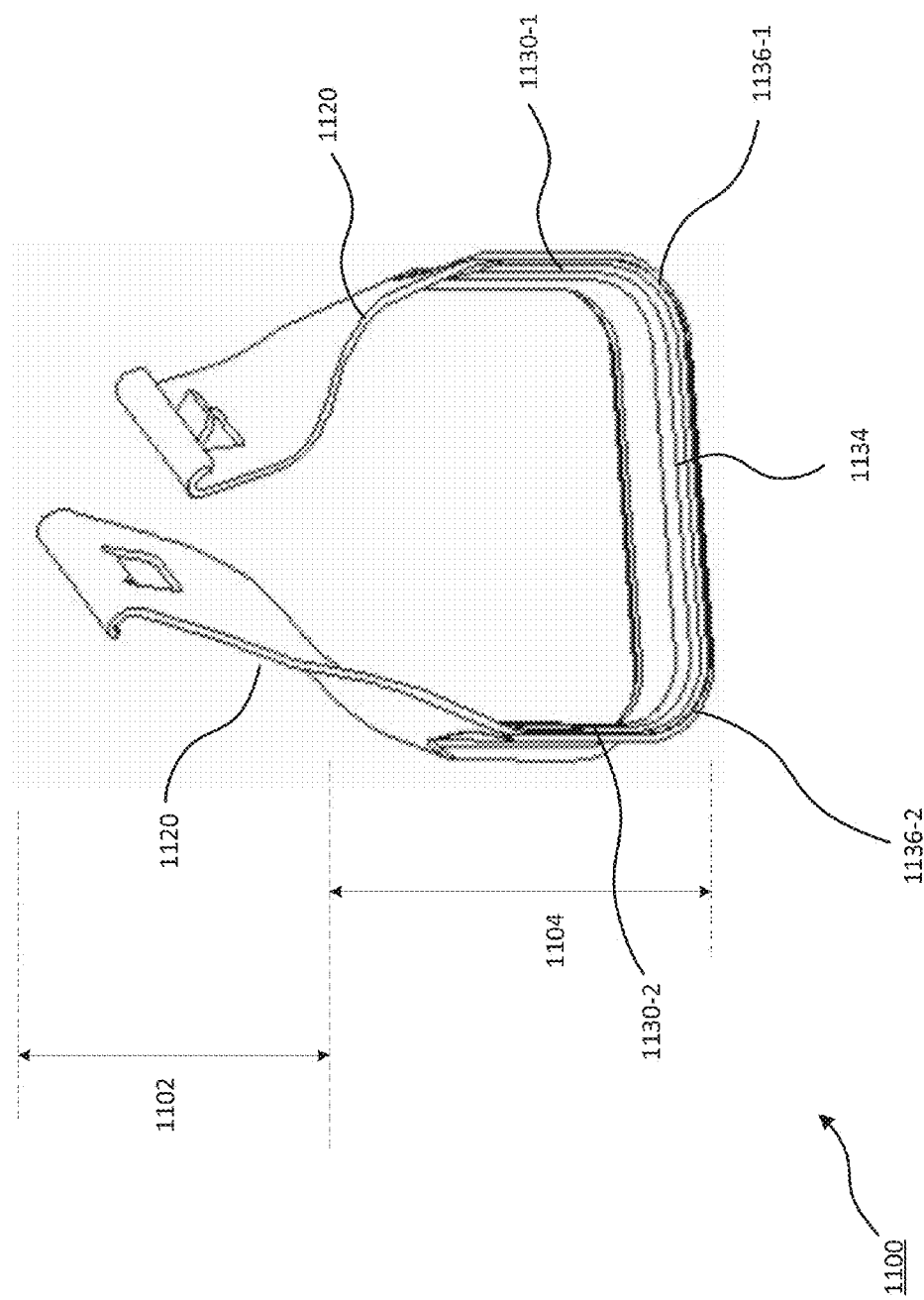
FIGS. 11A and 11B are drawings of an exemplary cable hanger in one embodiment.

In the embodiments discussed above (e.g., FIGS. 7A through 7C), cable saddles 104 and 1004 included a substantially semicircular portion. In other embodiments, support portion 104 may include other shapes. For example, FIG. 11A is a projection drawing of a cable hanger 1100 in such an embodiment. Hanger 1100 may include a latch portion 1102 similar to latch portion 402, for example. Latch portion 1002 may fully or partially latch onto a strut, such as strut 102.

Hanger 1100 may also include a cable saddle 1104. Cable saddle 1104 may include a more rectangular shape than semicircular (e.g., as compared to support portion 104). As shown in FIG. 11A, cable saddle 1104 may include a substantially flat base portion 1134, a first substantially flat side portion 1130-1, and a second substantially flat side portion 1130-2. A first curved portion 1136-1 may transition between first side portion 1130-1 and base portion 1134. A second curved portion 1136-2 may transition between second side portion 1130-2 and base portion 1134. Cable saddle 1104 may allow for a greater area for the bundle of cables 106 to pass through hanger 1100, as compared to hanger 104, for example.

Figure 12:
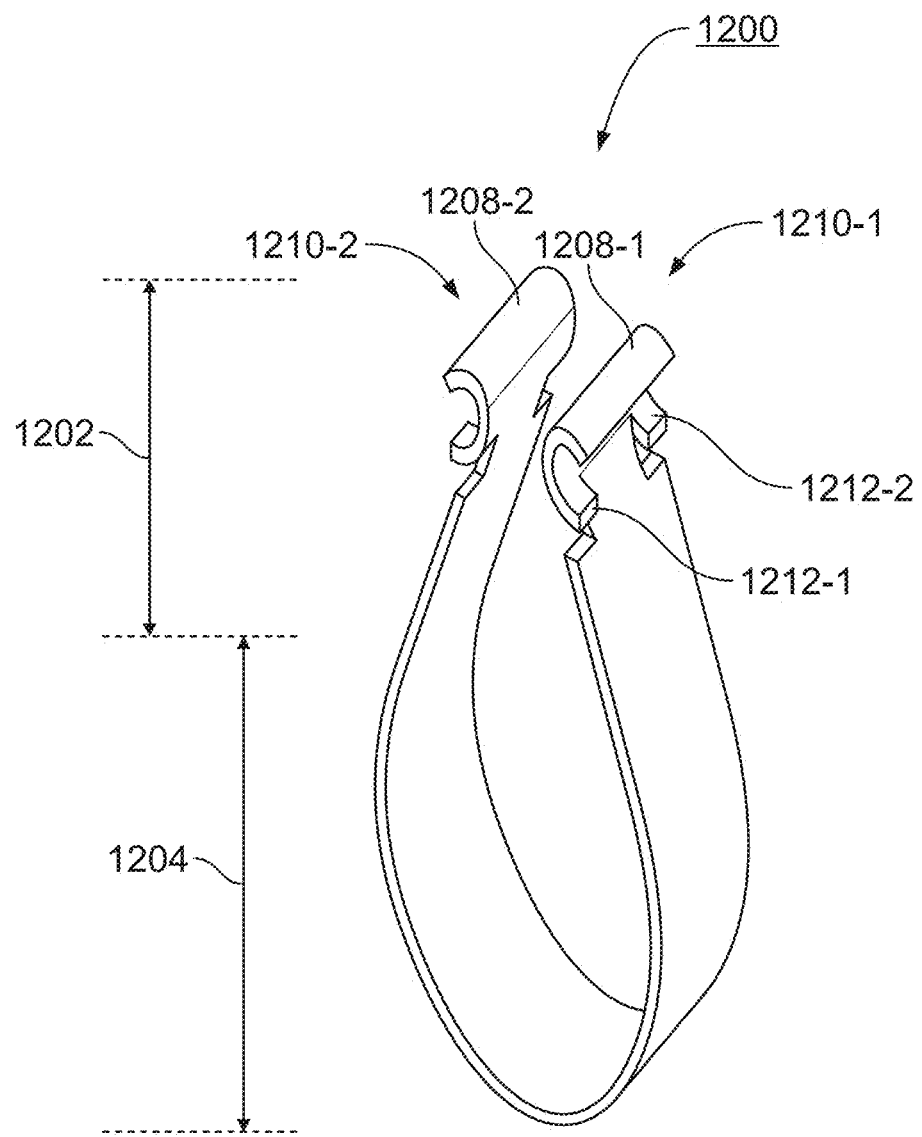
FIG. 12 is a projection drawing of an exemplary cable hanger in one embodiment.

In the embodiments discussed above (e.g., FIGS. 7A through 7C), latch 110-1 and 110-1 each included a tab. FIG. 12 is a projection drawing of a cable hanger 1200 in one embodiment with more than one tab. Hanger 1200 may include a latch portion 1202 and a cable saddle 1204 (or support portion 1204). Cable saddle 1204 may be configured similarly to and function similarly as support portion 404, for example. Latch portion 1002 may fully or partially latch onto a strut, such as strut 102. In the embodiment of FIG. 12, latch portion 1102 includes a first latch 1210-1 and a second latch 1210-2.

Latch 1210-1 may include a first hook 1208-1, a first tab 1212-1, and a second tab 1212-2. In the embodiment of FIG. 12, first tab 1212-1 and second tab 1212-2 may reside at the outer edges of hanger 1200. In this configuration, when latched to a strut, hanger 1200 may be discouraged from rocking back and forth (e.g., toward and away from directions parallel with the strut to which it attaches).

Figure 11B:
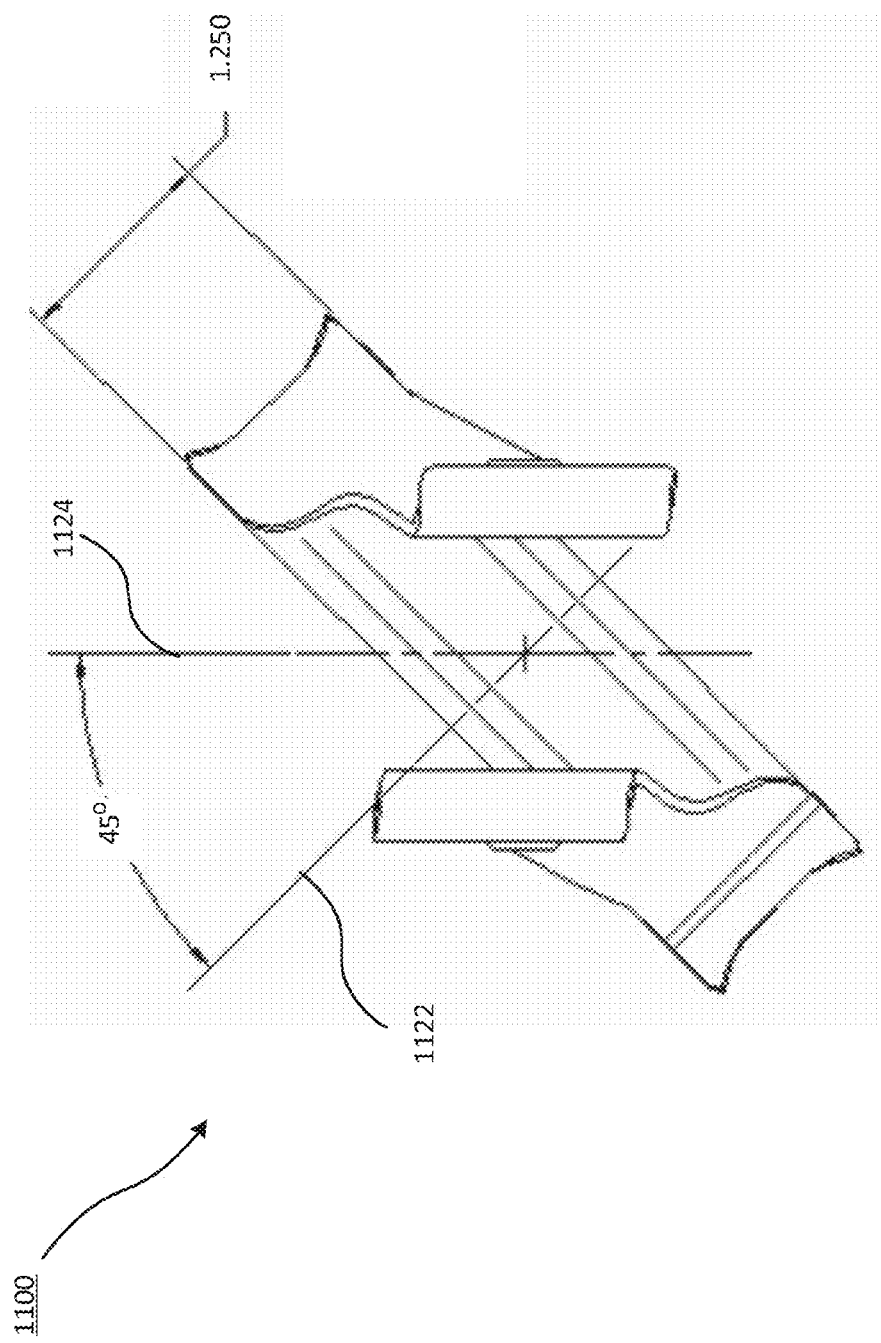
Figure 13B:
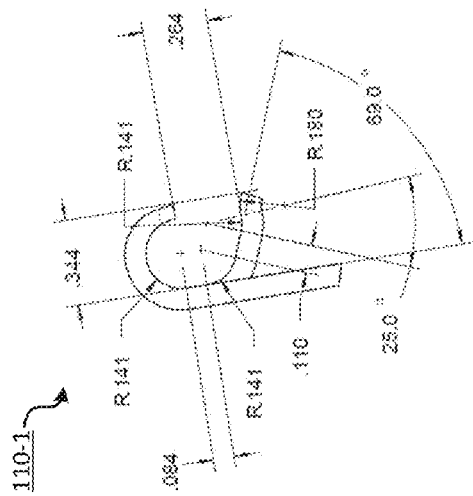
FIGS. 13A, 13B, and 13C are diagrams of the exemplary cable hanger of FIG. 1 including exemplary dimensions.
Figure 13C:
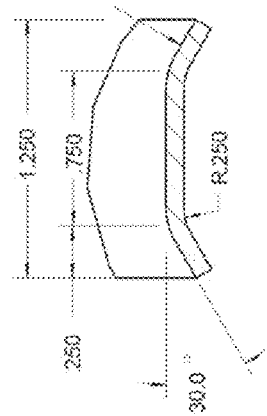
Figure 13A:
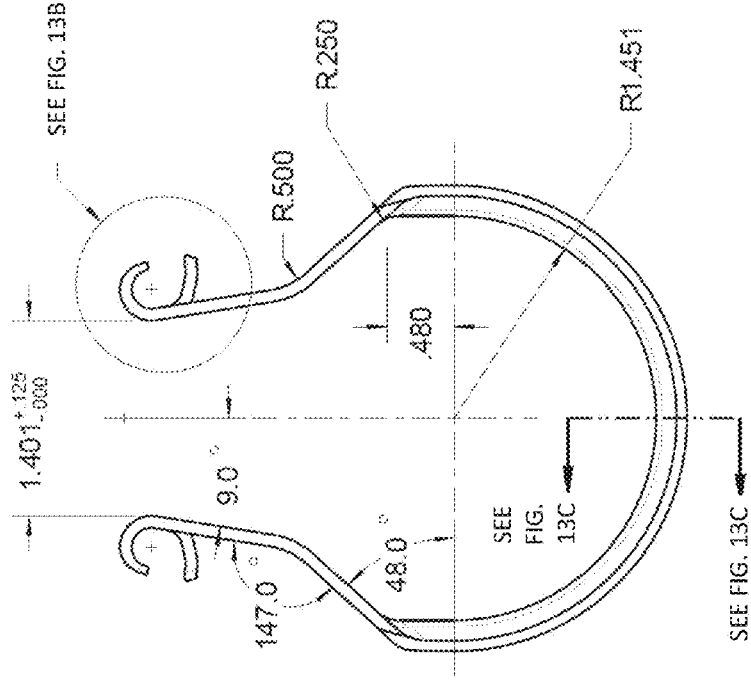

FIG. 13A is a diagram of exemplary hanger 104 viewed from one side, including exemplary dimensions. FIG. 13B is a cross-sectional view of a latch 110-1, including exemplary dimensions. FIG. 13C is a cross-sectional view of support portion 404 of hanger 104 including exemplary dimensions. Dimensions in FIGS. 13A through 11B are in inches and degrees and are exemplary. Other dimensions are possible.

Figure 14B:
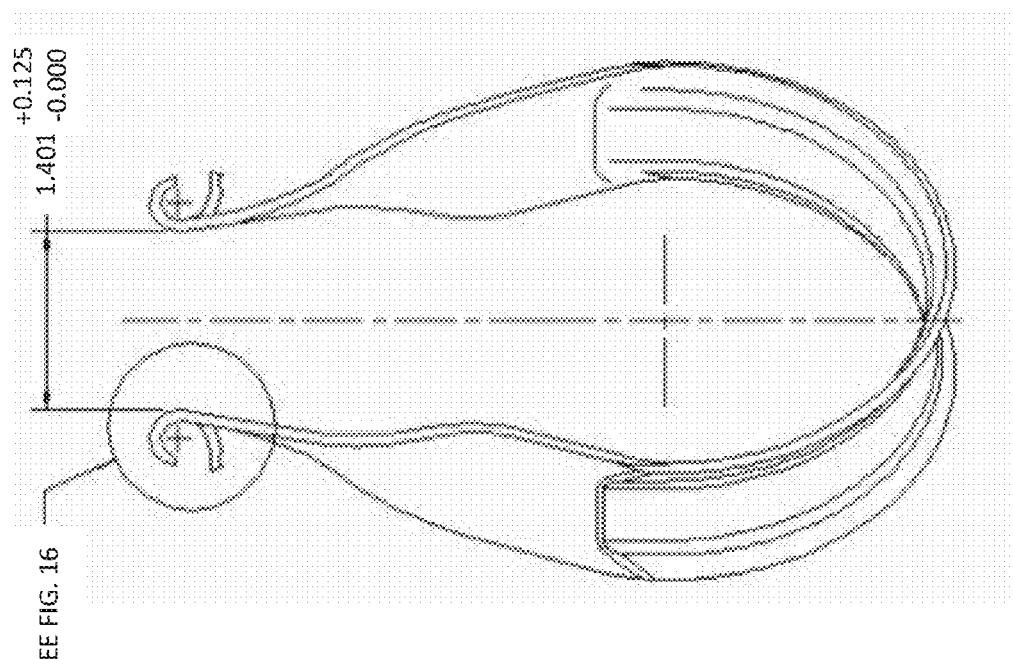
Figure 14C:
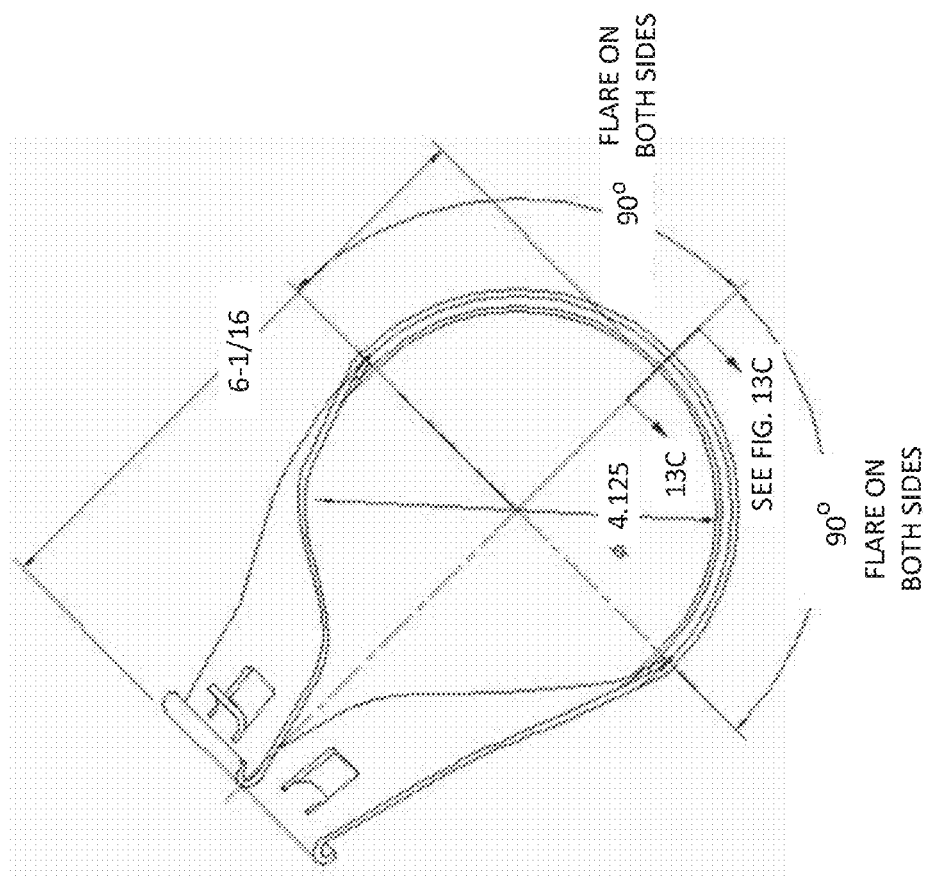

FIGS. 14A, 14B, and 14C are diagrams of exemplary hanger 1000, viewed from different angles, including exemplary dimensions. Dimensions in FIGS. 14A through 14C are in inches and degrees and are exemplary. Other dimensions are possible.

Figure 15A:
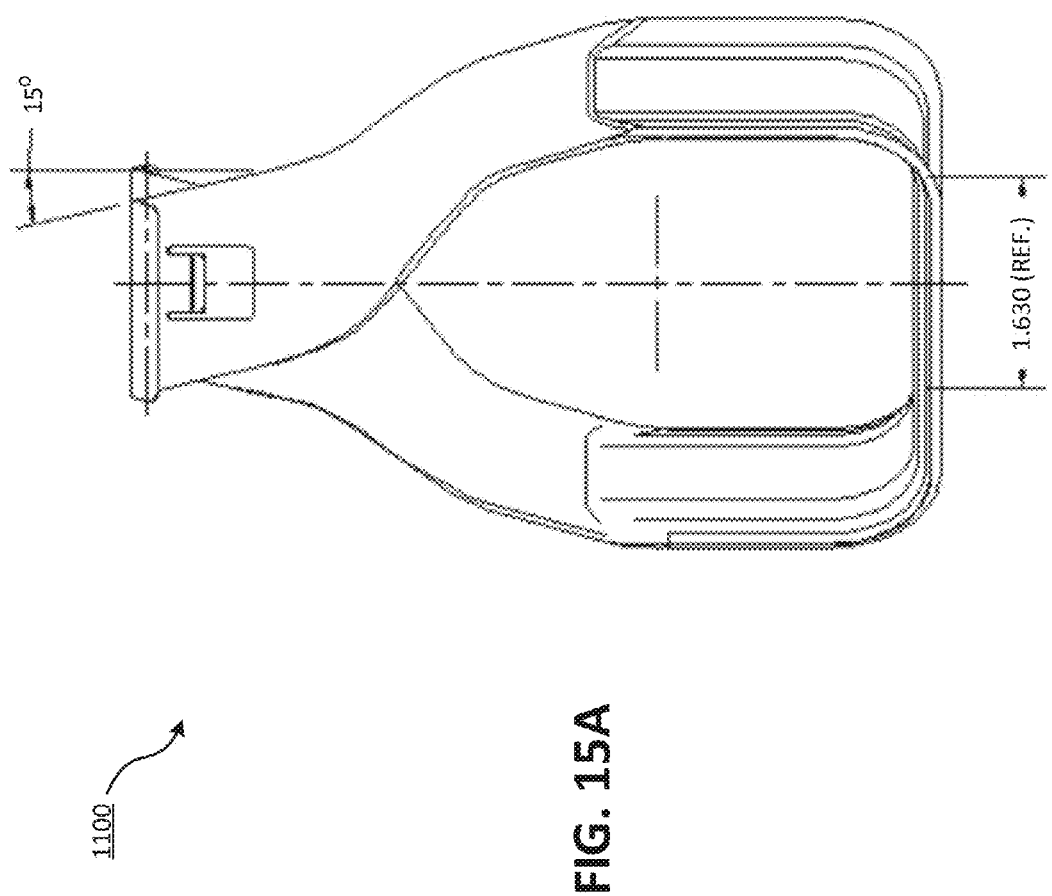

FIGS. 15A, 15B, and 15C are diagrams of exemplary hanger 1100, viewed from different angles, including exemplary dimensions. Dimensions in FIGS. 14A through 14C are in inches and degrees and are exemplary. Other dimensions are possible.

Figure 16:
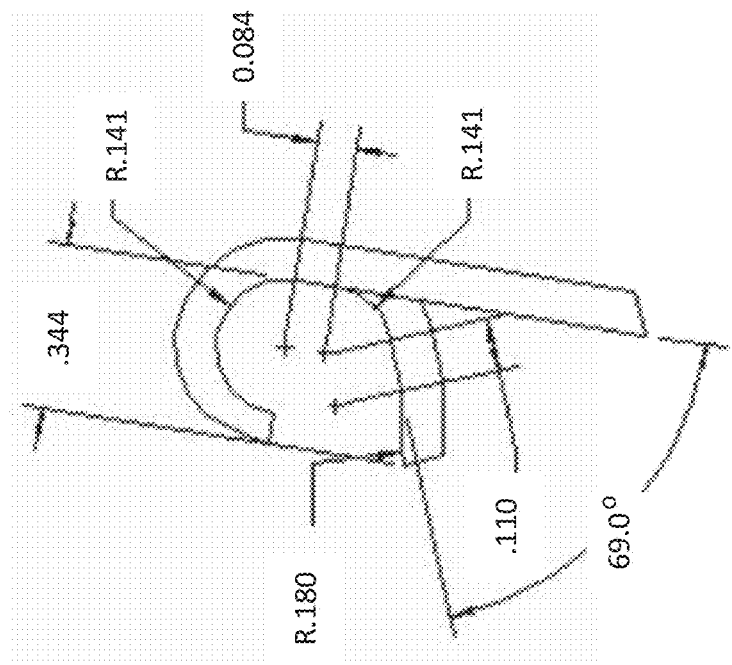
FIG. 16 is a diagram of an exemplary hook for the hangers of FIGS. 10 and 11.

FIG. 16 is a diagram of an exemplary hook for hanger 1000 or hanger 1100 viewed from the side, including exemplary dimensions. Dimensions in FIG. 16 are in inches and degrees and are exemplary. Other dimensions are possible.

Although the embodiments above include two similar latches, one embodiment may include two different latches. For example, in one embodiment, a cable hanger may include a latch similar to latch 110-1 and a latch similar to latch 1210-2. As another example, one latch may include one or more tabs (e.g., tab 410-1), whereas the other latch may not include any tabs. Further, a latch of a cable hanger may include a "hook" that is generally flat rather than partially circular. Latches may also take different forms depending on the shape of strut 102.

Strut 102 may take different forms as well. For example, strut may include one or more outwardly projecting portions instead of or in addition to an inwardly projecting portion (e.g., inwardly projecting portions 358). Thus, a flange (such as flange 356-1) may flare outward instead of inward. In this embodiment, the corresponding latch may match the shape of the strut.

In one embodiment, one or both of flanges 356 of strut 102 may include holes (e.g., elongated holes) through inwardly projecting portions 358 along the length of strut 102. In this embodiment, hook 408-1, for example, may pass through or hook onto such a hole in strut 102. Further, in this embodiment, upwardly projecting portion 360-1 may be omitted.

FIGS. 17 through 22B are directed to another exemplary embodiment. FIG. 17 is a drawing of an exemplary cable suspension assembly 1700 in an unassembled, open configuration in one embodiment. Assembly 1700 includes a strut 1702 and a cable hanger. The cable hanger includes a cable saddle 1704 and a latch 1710. Latch 1710 may latch cable saddle 1704 to strut 1702. In the configuration of FIG. 17, latch 1710 is not hooked or latched onto strut 1702 (e.g., it is "unassembled"). As described below, latch 1710 may pass through a hole 1756 in strut 1702. Further, in the configuration of FIG. 17, cable saddle 1704 is in an open position, leaving a gap 1726, allowing for cables (the longitudinal axis of cables) to be placed inside saddle 1704. Further, cable saddle 1704 includes downwardly formed portions 1716, similar to downwardly formed portions 420, discussed above.

FIG. 18 is an isometric projection drawing of exemplary strut 1702 with a cross section. Strut 1702 may include a bottom portion 1752, a first leg 1754-1 and a second leg 1754-2 (collectively, legs 1754). Strut 1702 may be configured similarly to strut 102, described above, but with a 180 degree difference in orientation along its major axis. Strut 1702 may include hole 1756 through which latch 1710 may pass, such that latch 1710 may secure saddle 1704 to strut 1702. Hole 1756 may be substantially square or rectangular. In one embodiment, hole 1756 may include rounded corners.

Latch 1710 may include a first flange 1718-1 and a second flange 1718-2 (collectively "flanges 1718"). When latch 1710 passes through hole 1756, the sides of latch 1710 having flanges 1718 may move toward each other as latch 1710 is compressed to fit through hole 1756. One side of latch 1710 may include an inward stop 1714 to prevent the sides of latch 1710 from moving further toward each other than stop 1714 allows. Compression of latch 1710 to move through hole 1756 may be supplied by force of an operator or by virtue of the movement of latch 1710 through hole 1756.

Once latch 1710 passes through hole 1756, the sides of latch 1710 may move away from each other to a rest state. In this embodiment, a top portion 1720 of latch 1710 may act as a spring to move the sides of latch 1710 to a rest state after having been compressed as latch 1710 moves through hole 1756. FIG. 19A is a drawing of a side view of the exemplary cable suspension assembly of FIG. 17 in an assembled, but open configuration. In this configuration, flanges 1718 may prevent latch from moving in a downward direction. Thus, in this embodiment, flanges 1718 may secure saddle 1704 to strut 1702.

In the configuration of FIG. 19A, cables may be placed into saddle 1704 through gap 1726. An end portion 1709 of saddle 1704 may be moved in the direction of an end portion 1708 of latch 1710, thus narrowing gap 1726. The end portion 1708 may include a first part 1722 and a second part 1724. In this embodiment, parts 1722 and 1724 may pass through a hole 1712 of saddle 1704. End portion 1708 may compress, moving parts 1722 and 1724 toward each other to allow end portion 1708 to pass through hole 1712, thus closing gap 1726. After end portion 1708 passes through hole 1712, end portion 1708 may uncompress (e.g., to a rest state).

FIG. 19B is a drawing of the side view of the exemplary cable suspension assembly of FIG. 17 in an assembled and open configuration. As shown in FIG. 19B, part 1722 may press up against saddle 1704 to prevent saddle 1704 from opening (e.g., and providing gap 1726). In this embodiment, parts 1724 and 1722 may act together (e.g., by being integrally formed of metal) to provide spring to uncompress end portion 1708. Likewise, the shape of saddle 1704 may provide spring to open hanger 1714 when not being held in place by part 1722.

FIGS. 20A and 20B are drawings of the exemplary cable hanger of FIG. 17 in an open and closed position, respectively. FIG. 20A shows flanges 1718. Flanges 1718 may latch onto strut 1702 by virtue of strut 1702 having hole 1756 with rounded corners. In one embodiment, as shown in FIG. 20A, flanges 1718 may be caddy corner from each other. In this embodiment latch 1710 may pass through hole 1756 after being rotated slightly such that a line between flanges 1718-1 and flange 1718-2 runs parallel with the major axis of strut 1702. After latch 1710 passes through hole 1756 and latch 1710 becomes uncompressed, the line between flanges 1718 reorients to be parallel with the diagonal of hole 1756. Thus, flanges 1718 latch onto the rounded corners of hole 1756. As shown in FIGS. 20A and 20B, latch 1710 may include shoulders 2002 (individually shoulders 2002-1, 2002-2, and 2002-3).

Figure 21B:
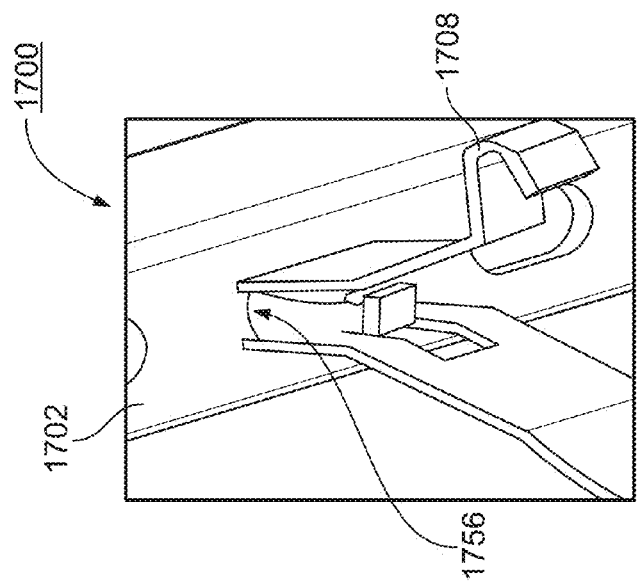
FIGS. 21A and 21B are drawings of the cable suspension assembly of FIG. 17 in an assembled but unlatched configuration.
Figure 21A:
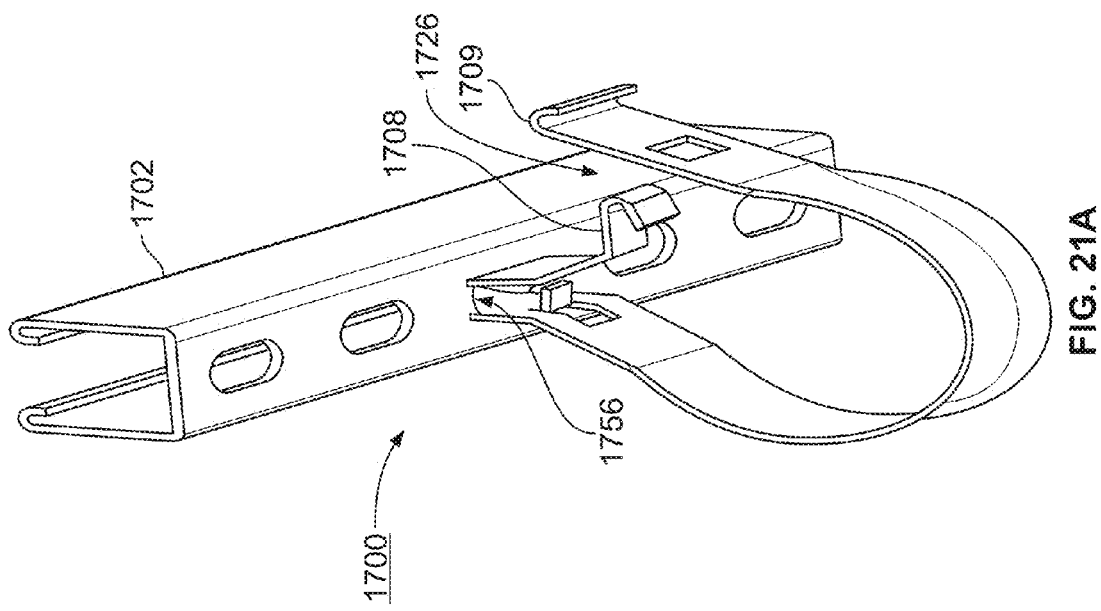
Figure 22B:
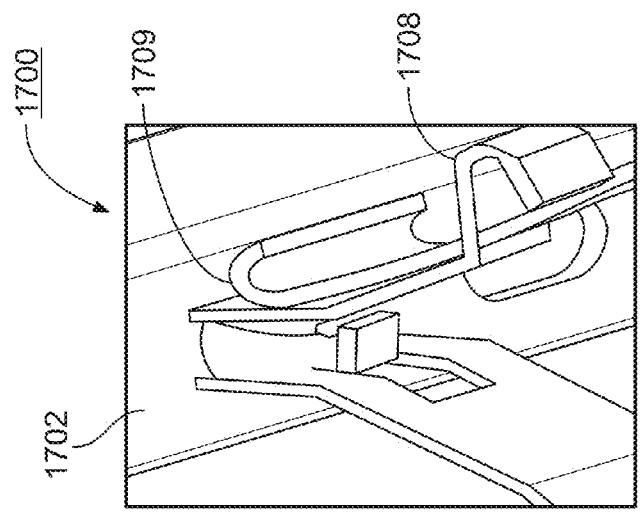
FIGS. 22A and 22B are drawings of the cable suspension assembly of FIG. 17 in an assembled and latched configuration.
Figure 22A:
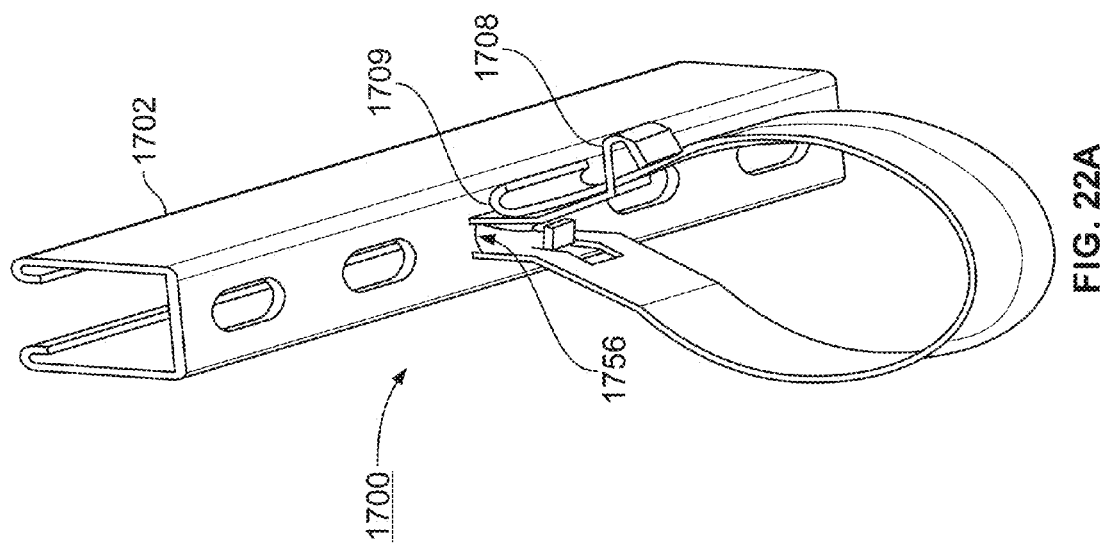

FIGS. 21A through 22B are provided for ease of understanding. FIGS. 21A and 21B are drawings of cable suspension assembly 1700 in an assembled but open configuration. FIGS. 22A and 22B are drawings of cable suspension assembly 1700 in an assembled and closed configuration.

An operator may open saddle 1704 by moving parts 1722 and 1724 toward each other, either by hand or with a tool. In this case, the spring in saddle 1704 may open the cable hanger, reforming gap 1726. Further, an operator may unassembled (e.g., remove the cable hanger from strut 1702) by compressing the sides of latch 1710 and, in one embodiment, rotating latch 1710 relative to strut 1702. Latched 1710 may be compressed by hand or using a tool, for example.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

For example, the cable hangers may be used with applications other than with solar panel support frames. In addition, the cable hangers may be used with any type of cables, such as communication cables, power cables (e.g., high or low voltage, direct or alternating current), etc.

Although terms such as "front," "rear," "forward," "backward," "top," "bottom," "left," and "right" are used, these terms are used for convenience to show elements in the figures relative to each other. These terms are not used to indicate absolute direction or position. As such, the terms "rear" and "front" may be interchanged, "top" and "bottom" may interchanged, etc.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A cable hanger, comprising:
    a latch including a first flange and a second flange, the latch being configured for selective compression from an uncompressed state to a compressed state, the first flange being separated from the second flange by a first distance when the latch is in the uncompressed state and by a second distance when the latch is in the compressed state, the second distance being smaller than the first distance and sized to accommodate insertion of a portion of the latch in a first direction through a hole in a strut, the first distance being sized to prevent the inserted portion of the latch from moving in a second direction through the hole, the second direction being opposite of the first direction; and a cable saddle configured to hold one or more cables, wherein when the cable hanger is suspended by the latch and an end portion of the cable saddle is detached from an end portion of the latch, the cable saddle is configured to receive the one or more cables through the gap formed between an end portion of the latch and an end portion of the cable saddle, the gap being closed when the end portion of the cable saddle is attached to the end portion of the latch.

2. The cable hanger of claim 1, wherein the end portion of the cable saddle includes a hole sized to receive passage of the end portion of the latch.

3. The cable hanger of claim 2, wherein the end portion of the latch is selectively compressible from an uncompressed state to a compressed state, the hole in the end portion of the cable saddle sized to receive insertion of the end portion of the latch when the end portion of the latch is in the compressed state and not when the end portion of the latch is in the uncompressed state.

4. The cable hanger of claim 1, wherein the latch is configured to pass through the hole in a base portion of the strut when the latch is in the compressed state and not when the latch is in the uncompressed state.

5. The cable hanger of claim 4, wherein the latch is structured to be biased to the uncompressed state.

6. The cable hanger of claim 1, wherein the latch includes a stop coupled to a portion of the latch and configured to contact another portion of the latch when the first flange is separated from the second flange by the second distance.

7. The cable hanger of claim 1, wherein the first and second flanges are on opposing sides of the latch.

8. The cable hanger of claim 1, wherein the cable saddle includes one or more cable tie holes.

9. A cable hanger, comprising:
a latch configured for suspended coupling of the cable hanger to a strut,
a cable saddle extending from one side of the latch, an end portion of the latch being selectively detachable from an end portion of the cable saddle, the end portion of the latch and the end portion of the cable saddle being separated by a gap, the gap being opened to receive passage of one or more cables into the cable hanger thorough the gap when the end portion of the latch is detached from the end portion of the cable saddle, the gap being closed when the end portion of the latch is attached to the end portion of the cable saddle,
wherein the latch is selectively compressible from a compressed state and an uncompressed state, the latch being structured to be biased to the uncompressed state.

10. The cable hanger of claim 9, wherein the latch includes a pair of flanges on opposing sides of the latch.

11. The cable hanger of claim 9, wherein the cable saddle includes one or more cable tie holes.

12. The cable hanger of claim 9, wherein the end portion of either the latch or the cable saddle is configured to be received in a hole in the end portion of the other of the latch and the cable saddle.

13. The cable hanger of claim 9, wherein the end portion of the latch is selectively compressible, and wherein the end portion of the cable saddle includes the hole, the hole being sized to receive the end portion of the latch when the end portion of the latch is compressed, the hole being sized to not permit passage of the end portion of the latch through the hole when the end portion of the latch is uncompressed.

14. The cable hanger of claim 9, wherein the latch includes a stop coupled to a portion of the latch and configured to contact another portion of the latch to limit compression of the latch.

15. The cable hanger of claim 9, wherein the cable saddle has a shape that is generally rectangular.

16. The cable hanger of claim 9, wherein the cable saddle has a shape oriented about a central axis of the cable saddle that is sized to hold one or more cables, and wherein the cable hanger further includes a transition portion between the latch and the cable saddle, the transition portion configured to orient the central axis of the cable saddle at an orientation that is non-parallel to a central longitudinal axis of the strut when the latch is secured to the strut.

17. The cable hanger of claim 16, wherein the latch includes an end portion, the end portion of either the latch or the cable saddle including a hole sized to receive the end portion of the other of the latch and the cable saddle to selectively secure the end portion of the cable saddle in the closed position.

* * * * *